3,110,413
METHOD OF MAKING OXIDIZED POLYMER OIL MELAMINE RESIN COATED CONTAINERS AND RESULTANT ARTICLE
John F. McKay, Cranford, and Donald F. Koenecke, Westfield, N.J., assignors to Esso Research and Engineering Company, a corporation of Delaware
No Drawing. Filed June 20, 1955, Ser. No. 516,772
6 Claims. (Cl. 220—64)

This invention pertains to a new composition of matter and to the coating of surfaces such as metals in sheet form.

The invention pertains more particularly to the coating of sheet metal which is to be fabricated into objects by stamping, bending, creasing, drawing, threading, turning, punching, and the like.

Machine operations, such as the foregoing, are particularly severe upon coatings or films adhering to the sheet metal, and in many instances, it is extremely difficult to obtain a formed object with a coating or film system adequate for the environment to which the finished article is to be subjected when in use.

To illustrate, many types of films and particularly those made from resinous materials, crack, check, striate, silk and/or peel when subjected to the foregoing mechanical operations.

Because of the great economical advantage of coating the sheet metal prior to the various forming operations, the importance of a film or film system which will withstand the various forming operations without injury cannot be overestimated.

Another quality of extreme importance, particularly in the case of certain uses to which the finished articles are to be put, is the relative insolubility and chemical inertness of the film or film system.

An outstanding example of such a use is in the food packaging field in which metal cans and metal foil wrappings are extensively used.

The term food is employed herein to mean that which is eaten or drunk or absorbed for nourishment or otherwise, and includes not only beverages such as beer, but also substances from which food is prepared, examples of which are coffee beans, whether ground or not, and tea leaves.

In the case of cans, for example, economical considerations make it extremely advantageous to apply the film or film system to the sheet metal while in the flat. The can parts are then cut, shaped and joined all in a manner well known in the art. Severe stresses are set up during the forming operations, particularly in the case of the die-drawing of the can ends. The can ends and portions of the can body are again subjected to severe stresses by the seaming chuck, seaming rolls, and cooperating parts of the can closing machine during the well known double-seaming can sealing operation.

For instance, the die-drawing step produces in the can ends not only angles of very nearly 90° with relatively sharp bends, but also a peripheral portion which is curled back upon itself.

A film or film system to be successful must withstand such and similar metal working operations without peeling or rupturing or otherwise failing in the slightest degree.

Metal caps are used in large quantity not only on glass bottles but also on certain types of metal containers, such as those for holding beverages.

In many cases, such caps are provided with threads for engaging cooperating threads upon the bottle or other container.

The operation for forming the threads in the metal caps is extremely severe, since the metal is frequently stretched by as much as 100% during the thread-forming operation.

In the case of metal foil wrappings, as is well known, the foil is usually drastically and sharply creased in forming the food packages, as well as by the user in opening and closing the packages. The coating on the foil therefore must be capable of successfully withstanding very severe stresses.

In the food packaging field it is, of course, absolutely essential that the film or film system be not only completely insoluble and chemically inert, but also completely incapable of imparting taste or odor to the food product.

In this connection, it is a well known fact that the ordinary tin lining is unsatisfactory in the case of certain foods of which grape juice, orange juice, and beer are outstanding examples.

Some foods develop hydrogen sulfide upon standing which, in turn, reacts chemically with the tin lining to form tin sulfide. In case any of the iron is exposed, such as through cracks in the tinplate, black iron sulfide is formed.

Furthermore, in the food packaging field, the packaged food stuff, after sealing of the can, is in many cases, subjected to a sterilization treatment by the application of heat. Such treatment, by reason of the increased temperatures involved, greatly accelerates any reactions capable of taking place.

Pack tests are commonly used to evaluate can coatings. For these tests, panels are coated with 0.30–0.34 mil films and can lids stamped out with a commercial can stamping machine. Several kinds of electrolytic tinplate from different sources are used for check purposes. The lids are then sealed, with a can-closing machine, on cans containing pumpkin in one case and synthetic meat in the other. The cans are inverted so that the foods contact the test coatings and then the cans are processed in a pressure cooker at 15 lbs. steam pressure (250° F.) for 50 minutes in the case of pumpkin, and 90 minutes in the case of synthetic meat. After cooling, the coated lids are cut off on a lathe so as to avoid destroying any of the test area on the covers. Failure of the can coating most generally occurs at the countersink area of the covers—which is the area around the circumference where the tinplate is subjected to the most severe bend during punching operations. Failures are rated by observing this area through a 30 × microscope. Numerical ratings are made from 0=unaffected to 4=complete failure, with a rating of 2 being considered on the borderline of acceptability. Adhesion of the film to the flat surfaces of the can cover is tested by scratching a cross through the coating immediately after opening the processed food cans. Scotch tape is pressed firmly over the area and quickly ripped off. If poor in adhesion, the coating is pulled off the tinplate.

Numerous attempts have been made to find a lacquer which might be applied over or substituted for the tin coating. Films made with previously known lacquers, as a rule, however, have failed to have sufficient adhesion and cohesion to resist forming operations, or they have failed to resist reaction with foods, or they have failed in that they have imparted taste or odor to the foods.

It is, therefore, the major object of the present invention to coat steel plate with baked liquid diolefin-polymer films which can withstand can-forming operations and subsequent food processing conditions without failure.

It is a further object of this invention to prepare can coatings which have increased adhesion and flexibility.

These and other objects of this invention are accomplished by first oxidizing a diolefin-polymer drying oil by blowing with air or oxygen at elevated temperatures, preferably in the presence of an aromatic solvent, such as Solvesso 100 (a substantially 100% aromatic fraction boiling between 315–350° F.), benzene, toluene xylene or other aromatic fractions with or without a catalyst such as iron naphthenate. The oxidized product, which will contain up to 20% oxygen, is then blended with a resin prepared by condensing melamine and formaldehyde in accordance with methods well known in the art. Such a resin is essentially soluble in aromatic hydrocarbons and/or alcohols. The oxidized polymer oil may be mixed with the melamine resin in the proportions of 90–70, preferably 85–80, parts of polymer oil to 10–30, preferably 15–20, parts of resin. The blended product is coated on the steel plate, which may be covered with a thin coat of tin if desired and baked at 300° F. or 325° F. ultimate metal temperature for 8–12 minutes.

According to the invention, 50 to 100 parts of butadiene and 50 to 0 parts of styrene are copolymerized in the presence of finely divided alkali metal catalyst, such as lithium, sodium, potassium, caesium and rubidium. The temperatures will vary between 40 and 105° C. As a polymerization catalyst about 0.6 to 8 parts of finely divided alkali metal per 100 parts of monomers is used, preferably about 1 to 5 parts.

The above choice of monomers is quite specific as halogen-containing monomers such as chloroprene or chlorinated styrene are not suited for polymerization in the presence of alkali metal. Higher homologues of butadiene, i.e. piperylene, isoprene, and dimethylbutadiene, are suitable for the purposes of the present invention. The replacement of styrene by its ring-alkylated homologues, such as para-methyl styrene, meta-methyl styrene, dimethyl styrene and the corresponding ethyl substituted homologues is the only variation of monomers permissable herein; however, styrene is the most practical from the economic standpoint. Alpha-methyl styrene is unsuitable because it is too unreactive toward alkali metal.

Materials used as diluents in the polymerization should be liquid at the polymerization temperature, that is, they should boil between 20 and 250° C., although more volatile materials boiling as low as −15° C., may also be used, providing that the polymerization pressure is increased correspondingly. Preferred diluents are essentially aliphatic hydrocarbons such as naphtha (boiling range about 90 to 120° C.), or straight run mineral spirits such as Varsol (boiling range about 150 to 200° C.), but butane, pentane, benzene, toluene, xylene, cyclohexane, butenes, pentenes or similar inert hydrocarbons are also usable, individually or in admixture with each other. The hydrocarbon diluents are used in amounts ranging from 50 to 300 parts by weight per 100 parts of monomers.

An important feature of the process involves the use of a substantial amount of certain ethers as co-diluents or modifiers along with the hydrocarbon diluent described above. A particularly outstanding promoter for the batch process has been found in dioxane-1,4 whose presence in the feed aids in the production of a colorless product of desirable viscosity and good drying properties, and promotes the reaction sufficiently to give 100% conversion at 50° C., in a period of about 5–10 hours. Similarly favorable results were also obtained with the diethyl ether of ethylene glycol, $H_5C_2OCH_2CH_2OC_2H_5$, with diethyl ether $(C_2H_5)_2O$, and also with the diethyl ether of diethylene glycol, $H_5C_2O(CH_2)_2.O.(CH_2)_2.OC_2H_5$. In the batch process, diethyl ether is usable, although the initial induction period tends at times to be somewhat long. The diethyl ether of ethylene glycol is not preferred, because with it a product having an undesirably high molecular weight is produced. However, diethyl ether is the preferred ether in a continuous process as the difficulty in starting up the reaction occurs only at the beginning of the polymerization which runs for a long period of time in contrast to batching runs which have to be started up frequently. Diethyl ether is less subject to undesirable side reactions with alkali metal, and it is a more vigorous promoter than dioxane. However, dioxane is usable also, but not preferred. Other ethers useful to a still lesser extent are diethyl acetal, vinyl isobutyl ether, dihydropyrane and ethylal, all of which have a favorable effect on improving the color of the product.

In contrast to the preferred ethers named earlier herein, the four ethers just named have a moderate retarding effect on the polymerization rate. Finally, all cyclic ethers having an O—C—O— group in a ring structure, such as dioxane-1,3, dioxolane, paraldehyde and glycol ethylidene diacetal, inhibit the polymerization rate so excessively that their use is impractical. Dimethyl ether also does not serve the desired purpose, both as regards reaction rate and product quality. Thus the cyclic ethers must have the oxygen atoms separated by at least two carbon atoms.

The ether promoter is used in amounts ranging from about 1 to 100 parts, preferably 5 to 50 parts by weight per 100 parts of monomers. In selecting the ether co-diluent it is especially desirable in many cases to select an ether having a boiling point of at least 10° C. below the lower limit of the boiling range of the hydrocarbon diluent, and thus, when using a mineral spirits having a boiling range of 150° C. to 200° C., ether co-diluents boiling between about 25 and 140° C., are preferred for the reason that their separation from the hydrocarbon diluent in the polymerized reaction mixture is greatly facilitated by virtue of the stated difference in boiling points. If the polymer is recovered in about 100% purity, the ether may conveniently boil in the range of the hydrocarbon diluent since both may be recycled together in making up the fresh feed to the reactor.

It is also advantageous to use about 10 to 50%, preferably 10 to 30 weight percent (based on catalyst) of an alcohol in the polymerization recipe. Suitable alcohols include isopropanol, isobutanol, isopentanol, secondary butanol, and tertiary butanol. The coarser the catalyst dispersion, the more essential it is to have a sufficient amount of alcohol promoter present.

The reaction time and induction period vary depending on the degree of catalyst dispersion, reaction temperature, purity of feed materials and sequence of monomer addition.

It is preferred to operate with a catalyst particle size of about 1 to 50, or 10 to 50 microns, such as a mixture ranging from 2 0to 40 microns. Such a catalyst can be prepared by dispersing the molten alkali metal in a hydrocarbon such as Varsol by means of a homogenizer such as an Eppenbach Homo-Mixer and cooling the resulting dispersion below the melting point of the metal to prevent coalescence of the dispersed particles.

The catalyst is usually fed to the reactor as a slurry of metal particles dispersed in 2 to 200 parts by weight of a hydrocarbon liquid, which may or may not be the same as the reaction diluent. Agitation of the reaction mixture during synthesis increases the efficiency of the catalyst.

Destruction of the catalyst at the end of the reaction is effectively accomplished by adding to the reaction mixture a moderate excess of an anhydrous $C_1$ to $C_5$ fatty acid which is soluble in the hydrocarbon mixture, e.g. formic, acetic or pentanoic, or with sulfuric acid as described in copending application Serial No. 396,324, filed December 4, 1953, now U.S. Patent No. 2,712,561. After destruction of the catalyst the crude polymerization product containing the salts, excess acid and other impurities is neutralized with ammonia, and the neutralized product is finally filtered preferably with a filter aid such as silica gel, clay, charcoal or its equivalent. Separation can also be accomplished by centrifuging, if desired. Other ways of destroying the catalyst may be used, such as by adding alcohol, or inorganic acids.

The product is usually a solution of polymeric drying oil in a suitable hydrocarbon solvent such as solvent naphtha or mineral spirits and is, depending on the amount and type of ether used, a clear, colorless to light yellow varnish composition, the polymer content of which has a viscosity of about 0.15 to 22 poises at 50% N.V.M. and preferably 0.15 to 3.0 poises at 50% N.V.M.

The stripped polymer oil thus obtained is dissolved in an aromatic solvent, such as benzene, toluene, xylene hemi-mellitene, pseudocumene, mesitylene, propyl benzene, cymene, cumene, ethyl toluene, and methylethyl benzene, or mixtures thereof or a synthetic mixture of aromatic hydrocarbons, such as Solvesso 100, boiling between 315 and 350° F. and having a kauri butanol value of about 90. The amount of solvent may be varied from two parts of polymer oil per part of solvent by weight to two parts of solvent per part of polymer oil. The solution thus obtained is contacted with oxygen or air which may be introduced through a porous thimble or distributing plate near the bottom of the tank. The temperature is maintained at 70 to 300° F. and the blowing is continued from 1 hour up to 4 days. Other methods of conducting the oxidation reaction are described in the examples.

Catalysts suitable for the oxidation reaction of this invention include organic salts of metals such as the naphthenates, octoates and other hydrocarbon soluble metal salts of cobalt, lead, iron and manganese. These catalysts are used in amounts ranging from 0.001% to 1.0%. Peroxides such as benzoyl peroxide and the like may be added to reduce the induction period.

It is understood that conditions of temperature and time of reaction, ratio of reactants, degree of dilution, presence or lack of solvents or catalysts and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer of this invention depends largely upon the extent to which the oxidation is carried. The degree or extent of oxidation in turn depends on various factors including time of oxidation, temperature, presence or absence of catalysts, type of solvent, etc. In general greater extent of oxidation results in less solubility of the oxidized polymer in paraffin hydrocarbon solvents. The oxidation can be carried out so that the product is soluble in paraffinic hydrocarbons indicating that the oxidation has proceeded to a relatively slight extent. The oxidation can also be carried out so that the product is insoluble in paraffinic solvents but is soluble in aromatic solvents indicating that the oxidation has proceeded to a high degree. The percent of oxygen in the product will vary according to the conditions from a trace to 20% or more, e.g. .05 to 20%.

The oxidized product is then mixed with a solution of a melamine-formaldehyde resin. This resin is prepared by reacting three molecules of formaldehyde with one molecule of melamine in accordance with the methods known in the art and commercially applied (see for example U.S. Patent 1,633,337). The oxidized polymer should contain a sufficient amount of oxygen to be compatible with the melamine resin, preferably at least 8.3%.

The advantages of the invention will be better understood from a consideration of the following experimental data which are given for the sake of illustration, but without intention of limiting the invention thereto.

EXAMPLE I

A butadiene-styrene drying oil was prepared from the following charge:

| | Parts |
|---|---|
| Butadiene-1,3 | 80 |
| Styrene | 20 |
| Varsol [1] | 200 |
| Dioxane | 30 |
| Isopropanol | 0.25 |
| Sodium [2] | 1.5 |

[1] Straight run mineral spirits; API gravity, 49.0; flash, 105° F.; boiling range, 150 to 200° C.; solvent power, 33–37 kauri-butanol value (reference scale: Benzene—100 K.B. value, n-heptane 25.4 K.B. value).
[2] Dispersed to a particle size of 10 to 50 microns by means of an Eppenbach Homo-Mixer.

EXAMPLE II

The polymer oil of Example I was dissolved in Solvesso 100 and blown with air at 225–250° F. until the oxygen content reached 9.26%. The operation was done in a 4 in. x 8 ft. steel pipe and increments of Solvesso added to replace volatilization losses. The product had a N.V.M. of 39%. In a similar experiment in the same apparatus for a longer period of time, a product containing 16.5% oxygen and having a N.V.M. of 35.7% was obtained.

EXAMPLE III

The polymer oil of Example I was dissolved in Solvesso 100 and 0.001% iron naphthenate catalyst added (as wt. percent metal on polymer solids). The solution was placed in a 2 in. x 3.5 ft. vertical glass column containing inert saddle packing and fitted with a reflux condenser and water trap at the top. Oxygen was blown into the system through a fritted glass bubbler at the bottom of the column. The reactor and connecting tubes were electrically heated to maintain a temperature of 240–250° F. After 6 hours blowing a product containing 9.7% oxygen and having an N.V.M. of 41.3% was obtained.

EXAMPLE IV

The polymer oil of Example I was dissolved in Solvesso 100 and 0.001 manganese naphthenate catalyst added (as wt. percent metal on polymer solids). 300 ml. of the solution was placed in an open one-liter flutted flask equipped with a Premier Dispersator for agitation and an oxygen inlet in the vapor space. Heat was supplied by an electric mantle to maintain a temperature of 240–250° F. Oxygen was arbitrarily passed in at a rate of 200 ml./min. and the dispersator operated at 2000 r.p.m. for 2 hours. A product containing 14.6% oxygen and having a N.V.M. of 55.3% was obtained.

EXAMPLE V

The oxidized polymer oil described in Example II containing 16.5% oxygen was blended with 10 to 30% (on a solids basis) of melamine-formaldehyde resin solution marketed by Rohm and Haas under the trade name of Uformite MM46 (hereafter referred to as melamine resin). The blends were clear. Thin films of these compositions were coated on can quality electrolytic tinplate and the flat panels cured at various times and temperatures. Can ends were then stamped out of the panels with a commercial can stamping machine and the lids evaluated in pack tests. Typical data are given in Table I. They show that 10% melamine resin does not impart the necessary flexibility and the films fail badly at the countersink area of the can covers. With 15% melamine resin, the can coatings are acceptable when an 8, 10 or 12 minute cure at 300° F. is employed. With a 20% melamine resin-80% oxidized polymer oil blend, very creditable can coatings are produced by a 12 minute cure at 300° F. With 25 or 30% melamine resin in the blend, can coatings are on the edge of acceptability. Economically, it is desirable to use as little melamine resin as possible in the can coating compositions of this invention.

Table I

EVALUATION OF BLENDS OF OXIDIZED POLYMER OIL-MELAMINE RESIN IN CAN COATINGS

| Can Coating No. | Ratio, Polymer Oil/Melamine Resi/ | Cure, °F. | Sward Hardness | Pack Tests [1] | | | |
|---|---|---|---|---|---|---|---|
| | | | | Countersink | | Flat Adhesion | |
| | | | | Pumpkin | Meat [2] | Pumpkin | Meat |
| 1 | 90/10 | 12' @ 300 | 38 | 4 | 3 | 0 | 0 |
| 2 | 90/10 | 10' @ 300 | 40 | 3 | 3 | 0 | 0 |
| 3 | 90/10 | 8' @ 300 | 34 | 4 | 3 | 0 | 2 |
| 4 | 90/10 | 6' @ 300 | 34 | 3 | 3 | 0 | 2 |
| 5 | 85/15 | 12' @ 350 | 44 | 4 | 4 | 0 | 3 |
| 6 | 85/15 | 10' @ 350 | 46 | 4 | 4 | 0 | 0 |
| 7 | 85/15 | 8' @ 350 | 38 | 3 | 3 | 0 | 0 |
| 8 | 85/15 | 6' @ 350 | 30 | 3 | 4 | 0 | 0 |
| 9 | 85/15 | 10' @ 325 | 42 | 1 | 0 | 0 | 0 |
| 10 | 85/15 | 8' @ 325 | 38 | 2 | 1 | 0 | 2 |
| 11 | 85/15 | 12' @ 300 | 42 | 0 | 1 | 0 | 0 |
| 12 | 85/15 | 10' @ 300 | 40 | 0 | 1 | 0 | 0 |
| 13 | 85/15 | 8' @ 300 | 34 | 0 | 0 | 0 | 0 |
| 14 | 80/20 | 12' @ 300 | 36 | 0 | 0 | 0 | 0 |
| 15 | 75/25 | 12' @ 300 | 42 | 1 | 2 | 0 | 0 |
| 16 | 70/30 | 12' @ 300 | 38 | 2 | 1 | 0 | 0 |

[1] Tests described in text. Ratings: 0=unaffected to 4=complete failure.
[2] Synthetic meat formula: 1000 ml. water, 50 g. cornstarch, 10 g. zein, 4 ml. ethyl acetoacetate, 100 ml. 0.1 M. citric acid, 90 ml. 0.2 M.disodium phosphate, 10 ml. oleic acid, 2 g. lecithin in 20 ml. methanol, 2 g.cystine, 140 ml. refined cottonseed oil.

EXAMPLE VI

80% of the oxidized polymer oils described in Example III were blended with 20% melamine resin and can coatings prepared therefrom as described in Example V. Curing temperatures were varied from 275° F. to 410° F. and baking times from 6 to 12 minutes. Times longer than 12 minutes are impractical commercially. The pack test data (given in Table II) clearly show that schedules of 10–12 minutes at 300° F. or 10–12 minutes at 325° F. are critical. Shorter times at these temperatures result in blushing and/or countersink failure while higher temperatures (350° F.) always give severe countersink failure. Table III also gives data on a commercial sanitary enamel can coating control. At the usually recommended curing schedule (12' @ 410° F.) failure was noted after meat processing.

Table II

CAN COATINGS WITH 80% OXIDIZED POLYMER OIL-20% MELAMINE RESIN

| Can Coating No. | Cure, ° F. | Sward Hardness | Pack Tests [1] | | | |
|---|---|---|---|---|---|---|
| | | | Countersink | | Flat Adhesion | |
| | | | Pumpkin | Meat | Pumpkin | Meat |
| 17 | 12' @ 410 | 40 | 4 | 4 | 0 | 0 |
| 18 | 10' @ 410 | 48 | 4 | 4 | 0 | 0 |
| 19 | 8' @ 410 | 46 | 4 | 4 | 0 | 0 |
| 20 | 6' @ 410 | 44 | 4 | 4 | 0 | 0 |
| 21 | 12' @ 350 | 42 | 4 | 4 | 0 | 0 |
| 22 | 10' @ 350 | 48 | 4 | 4 | 0 | 0 |
| 23 | 8' @ 350 | 48 | 4 | 4 | 0 | 0 |
| 24 | 6' @ 350 | 48 | 4 | 4 | 0 | 3 |
| 25 | 12' @ 325 | 40 | 1 | 0 | 0 | 0 |
| 26 | 10' @ 325 | 44 | 1 | 1 | 0 | 3 |
| 27 | 8' @ 325 | 42 | 2 | 2 | 0 | 0 |
| 28 | 6' @ 325 | 34 | 3 | 0 | ([2]) | 0 |
| 29 | 12' @ 300 | 34 | 0 | 0 | 0 | 0 |
| 30 | 10' @ 300 | 34 | 1 | 1 | 0 | 0 |
| 31 | 8' @ 300 | 34 | 3 | 2 | ([2]) | 0 |
| 32 | 12' @ 275 | 32 | 0 | 0 | ([2]) | 0 |

[1] Tests described in text. Ratings: 0=unaffected to 4=complete failure.
([2]) Blush.

Table III

COMMERCIAL CAN COATING SANITARY ENAMEL

| Can Coating No. | Cure, ° F. | Sward Hardness | Pack Test [1] | | | |
|---|---|---|---|---|---|---|
| | | | Countersink | | Flat Adhesion | |
| | | | Pumpkin | Meat | Pumpkin | Meat |
| 33 | [2] 12' @ 410 | 44 | 0 | 3 | 0 | 4 |
| 34 | 12' @ 350 | 46 | 3 | 3 | 0 | 3 |
| 35 | 12' @ 325 | 44 | 3 | 3 | 0 | 3 |
| 36 | 12' @ 300 | 48 | 4 | 3 | 0 | 4 |

[1] Tests described in text. Ratings: 0=unaffected to 4=complete failure.
[2] Recommended cure.

EXAMPLE VII

80% oxidized polymer oils prepared as described in Examples III, IV and V were blended with 20% melamine resin and can coatings prepared as described in Example VI. The pack test data given in Table IV show that the method of conducting the oxidation reaction of the polymer oil, the presence or absence of catalyst during oxidation or the viscosity of the product are not critical in making the can coating compositions of this invention. The data further show that oxygen contents of the oxidized polymer oils of at least 8.3 is critical. A composition made from an oxidized polymer oil containing only 6.3% oxygen would not cure tack-free in 12' at 300° F. or 325° F. At 350° F. can coatings failed at the countersink.

Table IV

CAN COATINGS FROM BLENDS OF 80% OXIDIZED COPOLYMER OIL AND 20% MELAMINE RESIN

| Can Coating No. | Oxidation of Copolymer Oil | | | | Cure, ° F. | Sward Hardness | Pack Tests [1] | | | |
|---|---|---|---|---|---|---|---|---|---|---|
| | Oxidized According to— | Percent Catalyst | Percent Oxygen | Vis., P/50% NVM | | | Countersink | | Flat Adhesion | |
| | | | | | | | Pumpkin | Meat | Pumpkin | Meat |
| 37 | Example II | None | 16.5 | 9.8 | 12' @ 300 | 42 | 1 | 0 | 0 | 0 |
| 38 | Example IV | .01 Mn | 14.4 | 18 | 12' @ 300 | 42 | 0 | 1 | 0 | 0 |
| 39 | do | .001 Fe | 12.8 | 9 | 12' @ 300 | 30 | 0 | 3 | 0 | 0 |
| 40 | do | do | 12.5 | 9 | 12' @ 300 | 18 | 0 | 0 | 0 | 0 |
| 41 | do | .1 Zn | 12.2 | 8.8 | 12' @ 300 | 16 | 0 | 0 | 0 | 0 |
| 42 | do | None | 11.9 | 55 | 12' @ 300 | 18 | 1 | 0 | 0 | 0 |
| 43 | Example III | do | 11.0 | | 12' @ 300 | 30 | 0 | 0 | 0 | 0 |
| 44 | do | .001 Fe | 10.7 | 5 | 12' @ 300 | 22 | 0 | 0 | 0 | 0 |
| 45 | Example IV | do | 8.3 | 3.8 | 12' @ 300 | 12 | 0 | 0 | 0 | 0 |
| 46 | Example III | None | 6.3 | 2.0 | [2] 30' @ 300 | 16 | 0 | 0 | 0 | 0 |
| 47 | do | do | 6.3 | 2.0 | 12' @ 350 | 24 | 1 | 3 | 0 | 0 |

[1] Rating: 0=unaffected to 4=complete failure. Tests described in text.
[2] Would not cure in 12' @ 300° F. or 325° F.

EXAMPLE VIII

Blends of the oxidized polymer oil of Example III containing 16.5% oxygen were made with resins other than melamine and can coatings prepared as described in Example V. The pack test data given in Table V show that melamine resin is specific for blending with oxidized polymer oil to make can coating compositions. Other amino resins or phenolic resins do not produce satisfactory can coatings.

Table V
CAN COATINGS FROM BLENDS OF OXIDIZED POLYMER OIL WITH MISCELLANEOUS RESINS

| Can Coating No. | Modifier in Blend With Oxidized Polymer Oil | Cure, °F. | Sward Hardness | Pack Tests [1] | | | |
|---|---|---|---|---|---|---|---|
| | | | | Countersink | | Flat Adhesion | |
| | | | | Pumpkin | Meat | Pumpkin | Meat |
| 48 | 20% Urea-triazine [2] | 12' @ 300 | 40 | 4 | 4 | 0 | 0 |
| 49 | 20% Triazine Alkyd Modified [3] | 12' @ 300 | 48 | 4 | 3 | 0 | 0 |
| 50 | 20% Modified Phenolic [4] | 12' @ 300 | 32 | 3 | 3 | 0 | 2 |
| 51 | do | 12' @ 325 | 48 | 3 | 3 | 0 | 3 |
| 52 | do | 12' @ 350 | 48 | 3 | 3 | 0 | 3 |
| 53 | 10% Modified Phenolic | 12' @ 300 | 38 | 3 | 3 | 0 | 1 |
| 54 | 5% Modified Phenolic | 12' @ 300 | 46 | 3 | 3 | 0 | 1 |

[1] Tests described in text. Rating: 0=unaffected to 4=complete failure.
[2] Uformite MX-61 marketed by Rohm and Haas.
[3] Uformite M-311 marketed by Rohm and Haas.
[4] 10 gallon China-wood oil modified phenolic varnish.

Table VI
LIQUID AND HEADSPACE RESISTANCE OF CAN COATINGS FROM 80% OXIDIZED POLYMER OIL-20% MELAMINE RESIN BLEND

[0.33-0.34 mil films cured 12' @ 300° F.]

| Can Coating No. | Electrolytic Tin-Plate [1] | Sward Hardness | Pumpkin Pack Test [2] | | | | | | Synthetic Meat Pack Test [2] | | | | | |
|---|---|---|---|---|---|---|---|---|---|---|---|---|---|---|
| | | | Countersink | | Flat Adhesion | | Blushing | | Countersink | | Flat Adhesion | | Blushing | |
| | | | Liquid | Vapor | Liquid | Vapor | Liquid | Vapor | Liquid | Vapor | Liquid | Vapor | Liquid | Vapor |
| 55 | .25B | 18 | 0 | 0 | 0 | 0 | 0 | 0 | 0 | 0 | 0 | 0 | 0 | 1 |
| 56 | .50B | 18 | 0 | 0 | 0 | 0 | 0 | 0 | 0 | 0 | 0 | 0 | 0 | 0 |
| 57 | .50N | 14 | 0 | 0 | 0 | 0 | 0 | 0 | 0 | 2 | 0 | 0 | 0 | 0 |

[1] .25B and .50B are quarter-pound and half-pound tinplate from a Baltimore factory. .50N is half-pound tinplate from a Newark factory.
[2] Tests described in text. Rating: 0=unaffected to 4=complete failure.

EXAMPLE IX

The pack tests described in Examples VI to IX were made with the pumpkin or synthetic meat in direct contact with the test coating on the can lids during processing and storage. In actual practice, of course, cans are not completely filled and in the socalled "head-space" coatings must withstand vapor-phase attack during processing. In the experiments of this example, the cans were half filled with pumpkin and synthetic meat, test lids sealed on, and the cans processed and stored laying on their sides. The lids were marked so that, after opening, performance of the coating in liquid contact and in vapor contact with the can contents could be evaluated.

80% of an oxidized polymer oil made as in Example IV and containing 9.8% oxygen was blended with 20% melamine resin and can coatings made by curing thin films 12' at 300° F. The data given in Table VI show that can coatings are produced with the composition of this invention which resist processing both in liquid and head space areas of the can. Furthermore, acceptable can coatings are produced on different types of electroylic tinplate from different steel mills.

EXAMPLE X

80% of oxidized polymer oil described in Example II and containing 16.5% oxygen was blended with 20% melamine resin and can covers prepared as described in Example V by curing 0.30–0.33 mil films 12' @ 300° F. Canned foods purchased at a local market were recanned using the test lids and processed as indicated in Table VII. After processing, the cans were shelf stored at 77° F. for one month with the foods in direct contact with the experimental coatings. Evaluations of these test lids are given in Table VII.

Table VII
FOOD PACK TESTS ON CAN COATINGS FROM 80% OXIDIZED POLYMER OIL-20% MELAMINE RESIN BLEND

| Can Coating No. | Food | Processing | | One Month Shelf Storage After Processing | |
|---|---|---|---|---|---|
| | | Min. | Lbs. Steam | Countersink | Flat Adhesion |
| 58 | Peas | 60 | 10 | 0 | 0 |
| 59 | Asparagus | 30 | 10 | 0 | 0 |
| 60 | String Beans | 30 | 10 | 0 | 0 |
| 61 | Carrots | 30 | 10 | 1 | 0 |
| 62 | Peaches | 10 | 5 | 0 | 0 |
| 63 | Applesauce | 8 | 5 | 1 | 0 |
| 64 | Tuna fish | 100 | 10 | 1 | 0 |
| 65 | Synthetic meat | 100 | 10 | 0 | 0 |

[1] Rating: 0=unaffected to 4=complete failure.

EXAMPLE XI

Can coatings were made from the polymer oil described in Example I and also from the oxidized polymer oil containing 16.5% oxygen described in Example III. The pack test data given in Table VIII show that satisfactory can coatings cannot be made from these two oils. The polymer oil of Example I is incompatible with melamine resin.

*Table VIII*

A ON COATINGS FROM COPOLYMER OIL AND FROM OXIDIZED COPOLYMER OIL

[0.30–0.34 mil films]

| Can Coating No. | Can Coating | Cure, °F. | Sward Hardness | Pack Tests [1] | | | |
|---|---|---|---|---|---|---|---|
| | | | | Countersink | | Flat Adhesion | |
| | | | | Pumpkin | Meat | Pumpkin | Meat |
| 66 | Copolymer oil from Example I | [2]12′ @ 380 | 40 | 3 | 4 | 0 | 4 |
| 67 | Oxidized Copolymer Oil from Example III. | 12′ @ 300 | 48 | 4 | 4 | 0 | 4 |
| 68 | do | 12′ @ 325 | 50 | 4 | 4 | 0 | 4 |
| 69 | do | 12′ @ 410 | 30 | 3 | 0 | 3 | 0 |

[1] Tests described in text. Rating: 0=unaffected to 4=complete failure.
[2] Would not cure tack-free in 12′ @ 325° F.

EXAMPLE XII

A polybutadiene was prepared in accordance with Example I except that no styrene was used in the recipe. This oil was oxidized by the method described in Example IV. A product containing 11.2% oxygen was obtained. 80% of this oxidized polymer oil was blended with 20% melamine resin and can coatings prepared as described in Example V. The following pack test data show that satisfactory can coatings can be made from compositions of this invention of polymer oil containing no styrene.

| Can Coating No. | Cure, °F. | Sward Hardness | Pack Tests | | | |
|---|---|---|---|---|---|---|
| | | | Countersink | | Flat Adhesion | |
| | | | Pumpkin | Meat | Pumpkin | Meat |
| 70 | 12′ @ 300 | 14 | 0 | 0 | 0 | 0 |

While the foregoing particular description has been concerned primarily with the application of the protective film or films to metal sheets of a gauge used in the manufacture of articles such as caps and "tin" cans, it will be obvious that the invention is not limited thereto but may be applied to any metal sheet material, and in fact, to metallic objects in general whether pre-fabricated or not, where a tough strongly adhering film or film system is desired. The fabrication of toys from sheet metal, for instance, represents another important field of application for this invention.

Thus, the resin film may be applied to metal foil.

As an illustration, tin foil and aluminum foil, each of which is used to package dairy products like butter and cheese, may be so coated. If desired, these materials in molten form may be poured into molds lined with foil coated in accordance with the invention.

So too, lead foil, such as is used to package tea leaves, may be coated in accordance with the invention.

Metal foil may be coated by any desired procedure. For example, the foil may be passed through a solution of the coating material and the excess removed by means of doctor blades or rolls. Or a conventional roll type coating procedure may be employed and the solvent removed and/or recovered in any suitable manner. Or the coating material may be poured or sprayed on the material to be coated and the excess removed by doctor blades or rolls, or simply allowed to drain away.

While the invention has been more particularly described in connection with the coating of sheet metal including foil in the flat, the resin film or film system may be applied during or after any forming operations for converting the initial material into the finished object. It is generally useful for coating metallic objects in general, whether fabricated from sheet metal or not, or whether pre-fabricated in whole or in part prior to application of the film or film system.

Since in the food packaging field the important consideration is that the resin in contact with the food be chemically inert, insoluble in the foodstuff, incapable of imparting odor and taste thereto, and strongly adherent to the enclosing wall, outside portions of the container or foil may be left uncoated, or may be coated with other materials, particularly if suitable, or with the materials of this invention with or without modifying agents besides those already mentioned, or otherwise.

The nature of the present invention having been thus fully set forth and specific examples of the same given, what is claimed as new and useful and desired to be secured by Letters Patent is:

1. A process for protecting steel plate against the corrosive effects of food and the like which comprises coating the plate with a mixture of 15–30 parts of a melamine-formaldehyde condensation resin and 85–70 parts of a liquid sodium polymer of butadiene which has been blown with air in the presence of a hydrocarbon solvent until the polymer contains 8.3–16.5% oxygen, and curing at an ultimate metal temperature of 300–325° F. for 10–12 minutes.

2. Process according to claim 1 in which the butadiene polymer is a copolymer of 80 parts of butadiene-1,3 and 20 parts of styrene.

3. A container for food products comprising a metallic receptacle having on an interior surface thereof a dried film of a mixture of 15–30 parts of a melamine-formaldehyde resin and 85–70 parts of a liquid sodium butadiene polymer which has been blown with air in the presence of a hydrocarbon solvent until the polymer contains 8.3–16.5% oxygen, said mixture having been cured at 300–325° F. for 10 to 12 minutes.

4. A method for producing a metallic food container element which comprises applying to sheet metal a coat of a mixture of 15–30 parts of a melamine-formaldehyde resin and 85–70 parts of a liquid sodium butadiene polymer which has been blown with air in the presence of a hydrocarbon solvent until the polymer contains 8.3–16.5% oxygen, curing said mixture at 300° to 325° F. for 10 to 12 minutes, cutting a blank from said sheet metal of a desired shape, and forming said blank to the finished shape of said food container element.

5. A method for producing a metal cap having sharply formed portions from sheet metal which comprises coating said sheet metal with a mixture of 15–30 parts of a melamine-formaldehyde resin and 85–70 parts of a liquid sodium polymer of butadiene which has been blown with air in the presence of a hydrocarbon solvent until the polymer contains 8.3–16.5% oxygen, curing said mixture at 300° to 325° F. for 10 to 12 minutes, cutting a blank of desired shape from said sheet metal, and die-drawing said blank to the finished shape of said cap.

6. A steel plate suitable for a container for food products having on a surface thereof a dried film of a mixture of 15–30 parts of a melamine-formaldehyde resin and 85–70 parts of an alkali metal catalyzed liquid polymer of a $C_4$ to $C_6$ conjugated diolefin which has been blown with air in the presence of a hydrocarbon solvent until the polymer contains 8.3–16.5% oxygen, said mixture having been cured at about 300° F. for about 12 minutes.

References Cited in the file of this patent

UNITED STATES PATENTS

| | | |
|---|---|---|
| 2,122,826 | Van Peski | July 5, 1938 |
| 2,324,078 | Gray et al. | July 13, 1943 |
| 2,447,772 | Rust | Aug. 24, 1948 |
| 2,467,233 | Rust | Apr. 12, 1949 |
| 2,625,523 | Garber et al. | Jan. 13, 1953 |
| 2,669,526 | Koenecke et al. | Feb. 16, 1954 |
| 2,699,413 | Seagren et al. | Jan. 11, 1955 |

FOREIGN PATENTS

| | | |
|---|---|---|
| 885,886 | France | Sept. 28, 1943 |